US005598218A

United States Patent [19]

Inoue

[11] Patent Number: 5,598,218

[45] Date of Patent: Jan. 28, 1997

[54] NTSC-PAL CONVERTER

[75] Inventor: Kiyoshi Inoue, Omiya, Japan

[73] Assignee: Fuji Photo Optical Co., Ltd., Omiya, Japan

[21] Appl. No.: 570,602

[22] Filed: Dec. 11, 1995

[30] Foreign Application Priority Data

Dec. 15, 1994 [JP] Japan .................................... 6-333329

[51] Int. Cl.[6] .......................................... H04N 7/07

[52] U.S. Cl. .......................................... 348/443; 348/458

[58] Field of Search .................................... 348/443, 441, 348/458, 459, 715, 454; H04N 7/01

[56] References Cited

U.S. PATENT DOCUMENTS 5,166,792 11/1992 Lyon ...................................... 348/443

*Primary Examiner*—Victor R. Kostak

[57] ABSTRACT

The present invention is an NTSC-PAL converter which can eliminate generation of bar noise, and convert image data from the NTSC format to the PAL format with less memory capacity. The converter comprises three field memories (1), (2) and (3) for storing image data in the NTSC format in which odd and even-numbered field data in the NTSC format are sequentially written. In reading for forming the image data in the PAL format, two memories which are not being written are selected so that data are sequentially read from memories in combination of, for example, (1) and (2); (2) and (3), and (3) and (1). That is, frame data for the PAL format is formed by adding and reading field data, and by interpolating them in predetermined interval. This eliminates such situation where writing of image data in the NTSC format overtakes reading of PAL image data.

2 Claims, 5 Drawing Sheets

NTSC-PAL CONVERTER

BACKGROUND OF THE INVENTION

This specification claims the priority of Japanese Patent Application No. 6-333329, filed on Dec. 15th, 1994.

1. Field of the Invention

The present invention relates to a converter for converting image data in NTSC format into that in PAL format, and, more particularly, to a memory configuration for an apparatus applied to images obtained by an electronic endoscope.

2. Description of the Prior Art

A TV monitor used for an electronic endoscope or the like generally employs the NTSC (National Television System Committee) system. When images obtained by the electronic endoscope are intended to be displayed on a PAL (Phase Alternation by Line) system monitor, an NTSC-PAL converter is useful. That is, the number of scanning lines is 525 lines in the NTSC system and 625 lines in the PAL system. Scanning line data for 525 lines is converted into scanning line data for 625 lines by interpolation.

FIG. 5 shows the process of NTSC-PAL conversion for frame data, in which data D1 of an odd-numbered line NO1 in the NTSC format stored in each field memory is added to data D2 of an even-numbered line NE1, data of (D1+D2)/2 is read as data for an odd-numbered line PO1 in PAL format, and data for odd-numbered line PE1 is read according to data of an even-numbered line NE1 and that of an odd-numbered line NO2. Similarly, PAL format line data P02, PE2, . . . are sequentially read. As shown in the figure, for example, two line data PO3 and PE3 consisting of duplicated data (same data) are read for the PAL system based on line data NO3 and NE3 in the NTSC format, and two line data P06 and PE6 consisting of duplicated data are similarly read based on line data NE5 and NO6.

Thus, data of PAL system with 625 scanning lines can be obtained from data of NTSC system with 525 scanning lines by reading and interpolating the same data in duplicate. With the above converter, image signals in the NTSC format from an electronic endoscope and other various devices can be easily converted into those in the PAL format, thereby being able to reduce the cost and the number of control steps with a common design.

However, the above-mentioned conventional NTSC-PAL converter has a problem such that bar noise occurs in the horizontal direction because the time for creating image data of one field or frame differs for each system. FIG. 6 shows the relationship between image data in NTSC format written in a field memory and frame data in PAL format read from that memory on a transversal time base. That is, the converter is provided with two field memories (1) and (2) for storing images in the NTSC format. Odd-numbered field data 0 (ODD) N0, ON1, ON2, . . . are written in the field memory (1), and even-numbered field data E (EVEN) N0, EN1, EN2, . . . are written in the field memory (2), these data being alternately written while being updated. The writing is performed every field cycle of 16.6 ms (1/60 seconds).

Then, under the read control shown in FIG. 5, image data in the PAL format, that is, odd-numbered frame data OP1, even-numbered frame data EP1, odd-numbered frame data OP2, even-numbered frame data EP2, . . . are formed every 20 ms (1/50 seconds). The odd-numbered frame data OP1 is formed basing on the field data ON1 and EN1, as shown in the figure, while the even-numbered frame data EP1 is formed basing on the field data EN1 and ON2.

However, as described above, the time for writing one field data in the field memories (1) and (2) is for the NTSC system, and 1/60 seconds=16.66 . . . ms, while the read time for image data of the PAL system is 1/50 seconds=20 ms. This time difference causes the above writing to overtake the reading. That is, FIG. 7 shows the data write/read status by noticing an overtake point B in FIG. 6. At the overtake point B, the line NO4 of the odd-numbered field data ON3 from the field memory (1) is added to the line NE4 of the even-numbered field data EN3 from the field memory (2), and the line PE4 for the frame data OP3 is read.

However, at the point B, the data for line NO4 in the field memory (1) is updated, and the writing overtakes the reading at the end of the line NO4 so that, on and after the line NO5, the line PO5 for the frame data OP3 would be generated based on the rewritten data. Therefore, in the frame data OP3, there occurs a break (shifting of time base) at the point B. The break in data may not cause a serious problem in a still image, but generates a horizontal bar noise in a dynamic image, particularly, in a one with large amount of motion.

The present invention is made in view of the above problems, and intended to provide an NTSC-PAL converter which can eliminate generation of bar noise, and can convert image data in the NTSC format into that in the PAL format with less memory capacity.

BRIEF SUMMARY OF THE INVENTION

To eliminate the bar noise, for, example, one more set of odd and even-numbered field memories may be added to prepare field memories for four fields in which image data for four fields are time-serially stored, and reading of one set of field data is controlled while the other set of field data is being written. However, such arrangement requires field memories for four fields so that the memory capacity is uselessly increased.

Thus, the present invention is an NTSC-PAL converter for generating image signals in the PAL format from signals in the NTSC format comprising field memories for three fields which are provided for storing the image data in the NTSC format for three fields, a write control circuit for sequentially writing and controlling field signals in the NTSC format in the field memories for three fields, a read control circuit for selecting from these field memories at the moment to start the conversion into the PAL format two field memories which are not being written, and controlling reading so that the image data in the two field memories is sequentially read, and an output circuit for generating image signals in the PAL format from the image signals read by the read control circuit.

Here, the read control circuit preferably generates the frame image signals in the PAL format by adding horizontal line data of an odd-numbered field to that of an even-numbered field to produce horizontal line data of frame data in the PAL format, and reading and interpolating data in duplicate every predetermined number of horizontal lines. In addition, the output circuit may be an adder circuit.

With such arrangement, odd and even-numbered field data in the NTSC format are sequentially stored in the three field memories, and, when they are read for transfer to the PAL system, two field memories which are not being written are selected. For example, when the number of three memories is assumed to be (1), (2) and (3), a combination of (1) and (2), (2) and (3), or (3) and (1) is selected, and the image data in the PAL format is generated from the field data in them. Accordingly, writing in the memory never overtakes reading for generating the PAL image, and the above combination always provides odd-numbered field data and even-numbered field data being temporally connected so that generation of bar noise is eliminated.

DESCRIPTION OF THE PREFERRED EMBODIMENTS

Figure 1:
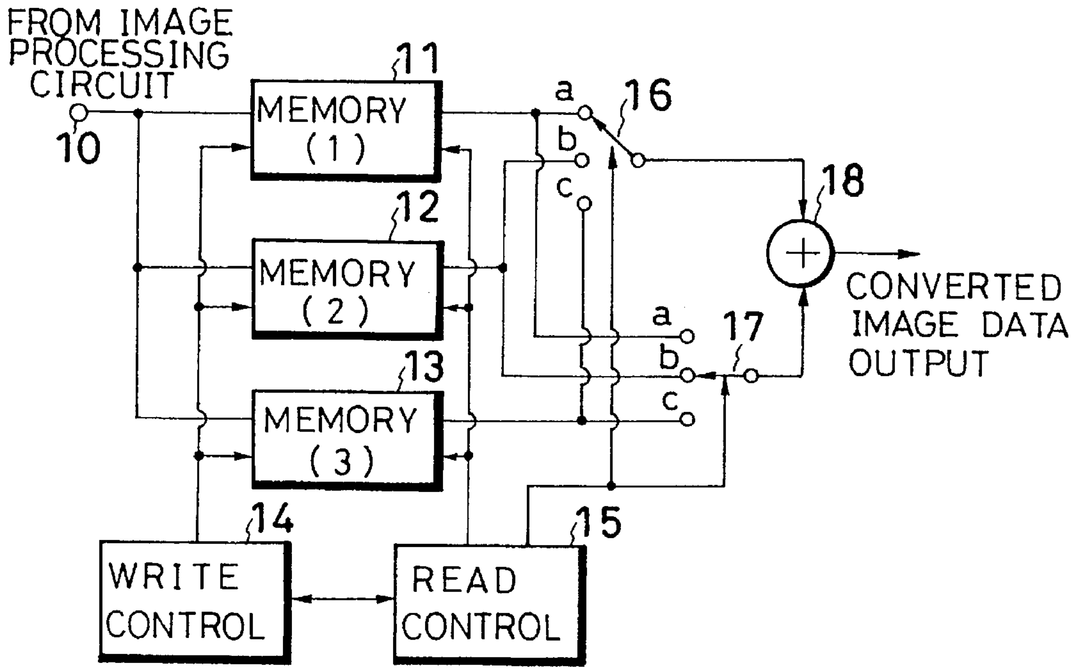
FIG. 1 is a circuit diagram showing the arrangement of a memory control in an NTSC-PAL converter according to an embodiment of the present invention.

FIG. 1 shows the arrangement of a memory control in an NTSC-PAL converter according to an embodiment. In the figure, input into a terminal 10 is an image signal processed by an image processing circuit of an NTSC system, the image signal being, in the case of an electronic endoscope, for example, a composite video signal which is formed by processing a signal obtained by a CCD with processing such as signal amplification, gamma correction, or white balance. Connected to the terminal 10 are three memories of memory (1) 11, memory (2) 12, and memory (3) 13 for storing image data for three fields to which, in turn, a write control circuit 14 and a read control circuit 15 are connected. Switching circuits 16 and 17, and an adder 18 are provided at the outputs of these memories 11, 12, and 13.

Figure 5:
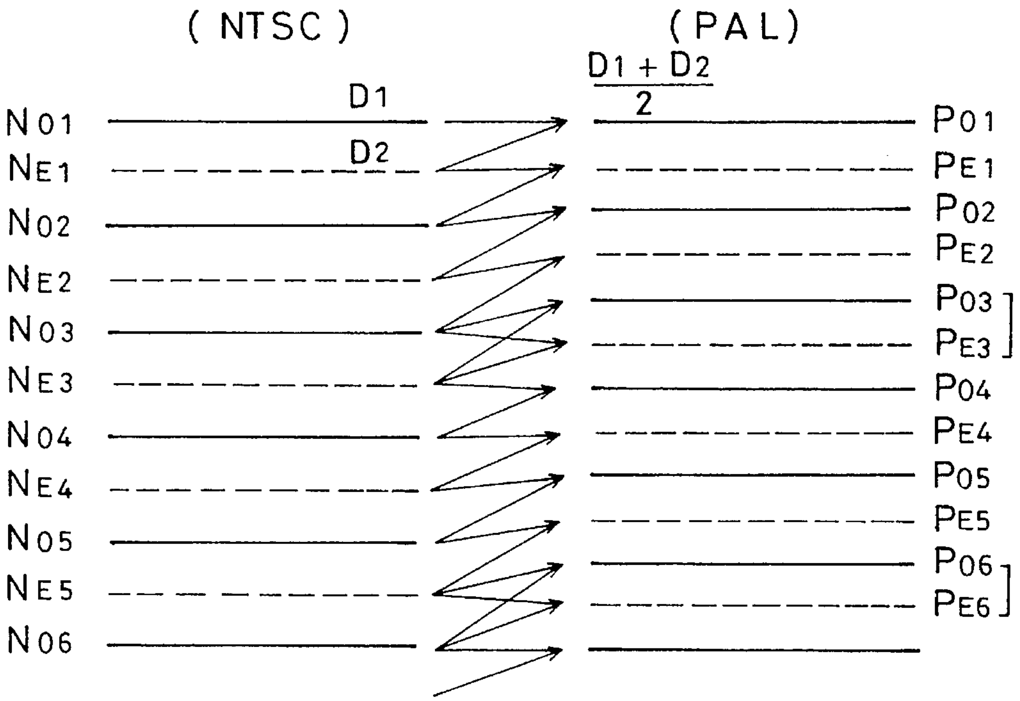
FIG. 5 is a diagram illustrating how to produce image (frame) data in PAL format from image (frame) data in NTSC format.
Figure 6:
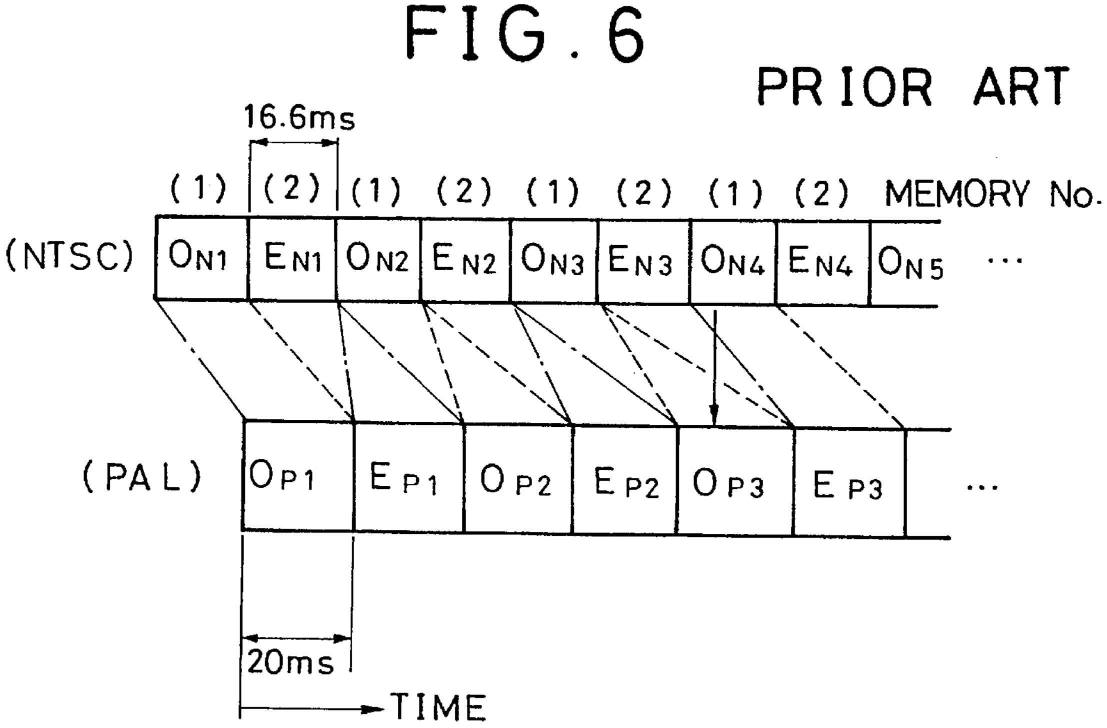
FIG. 6 is a diagram time-serially showing the relationship between image data being write/read controlled in a conventional device.
Figure 7:
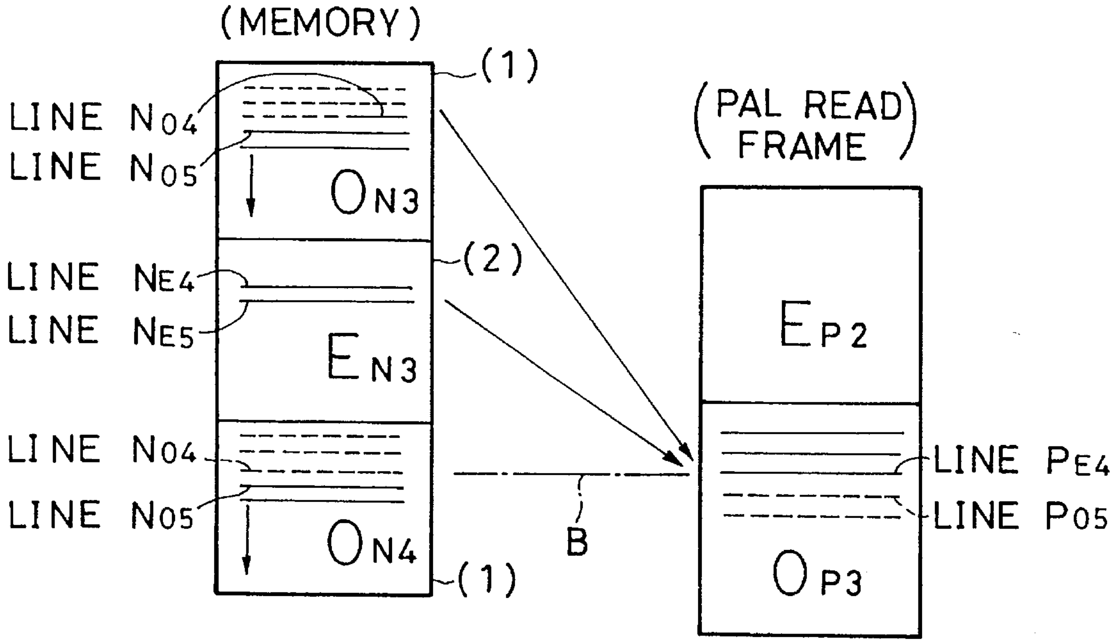
FIG. 7 is a diagram illustrating the relationship between write/read controls at the point B in FIG. 6.

The write control circuit 14 stores the image signal input from the terminal 10 in the memories 11, 12 and 13 in order, reads the number of memory being written and outputs it to the read control circuit 15. The write control circuit 14 performs write control with the control clock of the NTSC system, and processes one field in 16.66 . . . ms (1/60 seconds). The read control circuit 15 selects a memory other than those being written, and reads data at a read rate synchronized with the control clock of the PAL system. That is, reading from each of memories 11, 12 and 13 is controlled while performing interpolation as in FIG. 5.

In the switching circuits 16 and 17, the terminal a of the switching circuit 16 and the terminal b of the switching circuit 17 are selected when the memory (1) 11 and the memory (2) 12 are to be selected; the terminal b of the switching circuit 16 and the terminal c of the switching circuit 17 are selected when the memory (2) 12 and the memory (3) 13 are to be selected; and the terminal a of the switching circuit 16 and the terminal c of the switching circuit 17 are selected when the memory (3) 13 and the memory (1) 11 are to be selected. Then, the image data in the selected memories is subject to the addition of (D1+D2)/2 in the adder 18, and output from the adder 18 as image data for one frame in the PAL format, that is, image data accommodating 625 scanning lines, in 20 ms (1/50 seconds).

Figure 2:
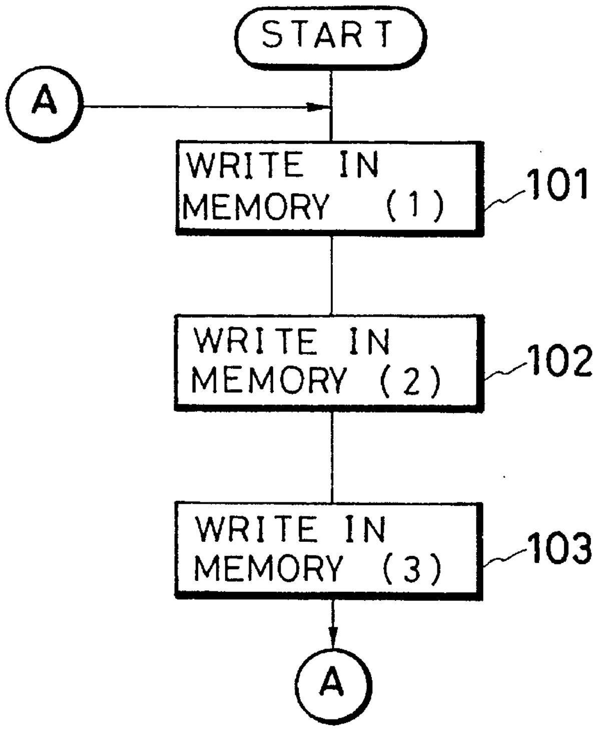
FIG. 2 is a flowchart illustrating the operation of the write control circuit in FIG. 1.

The operation of the embodiment with the above arrangement will be explained by referring to FIGS. 2–4. FIG. 2 shows the control operation in the write control circuit 14. As shown in the figure, the image data in the NTSC format supplied from the image processing circuit is sequentially written in the memory (1) 11 (step 101), in the memory (2) 12 (step 102), and in the memory (3) 13 (step 103) for storing the image data of three fields.

Figure 3:
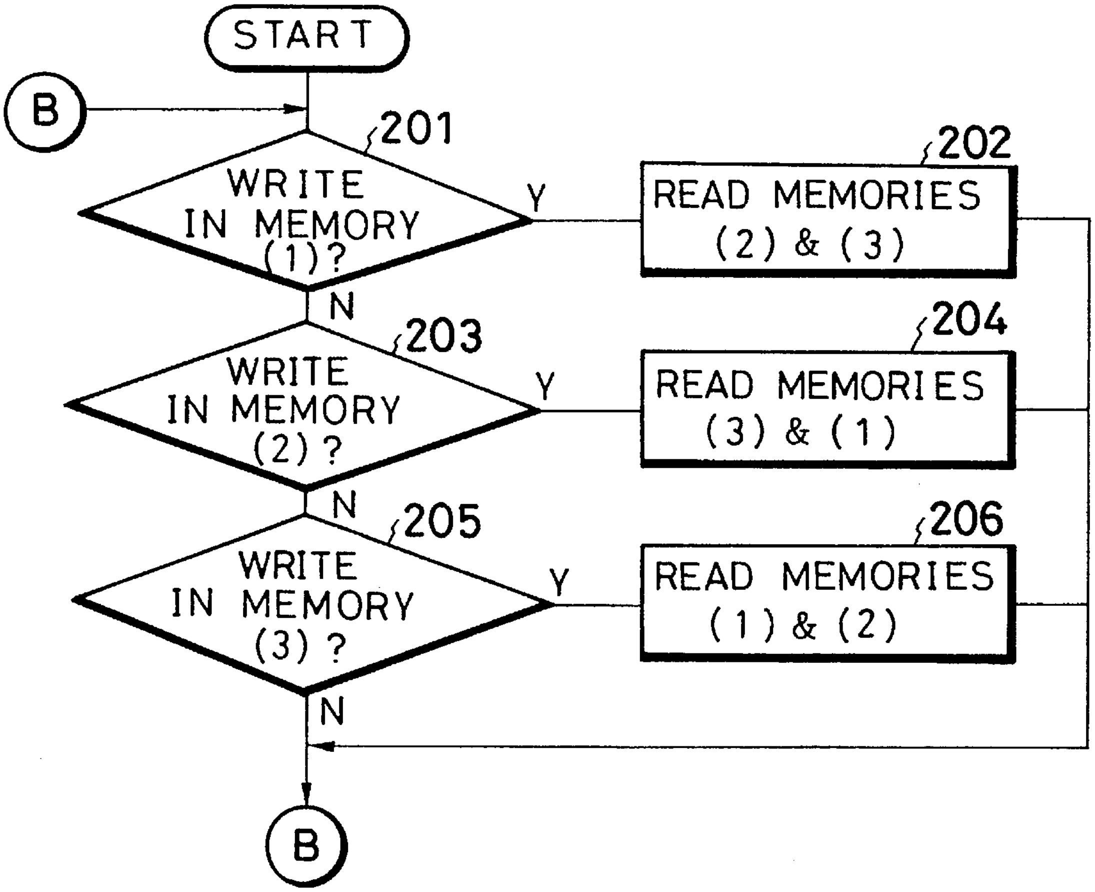
FIG. 3 is a flowchart illustrating the operation of the read control circuit in FIG. 1.

FIG. 3 shows the control operation in the read control circuit 15. Step 201 determines whether or not the memory (1) 11 is being written. If so (Yes), the data is to be read from the memories (2) and (3) (step 202) so that the terminal b of the switching circuit 16 and the terminal c of the switching circuit 17 in FIG. 1 are selected. Step 203 determines whether or not the memory (2) is being written. If Yes, the data is to be read from the memories (3) and (1) (step 204). In this case, the terminal a of the switching circuit 16 and the terminal c of the switching circuit 17 are selected. The next step 205 determines whether or not the memory (3) is being written. If Yes, the data is to be read from the memories (1) and (2) (step 206) so that the terminal a of the switching circuit 16 and the terminal b of the switching circuit 17 in FIG. 1 are selected. Then, these data for two frames (even and odd-numbered) are input into the adder 18 which in turn outputs frame data in the PAL format.

Figure 4:
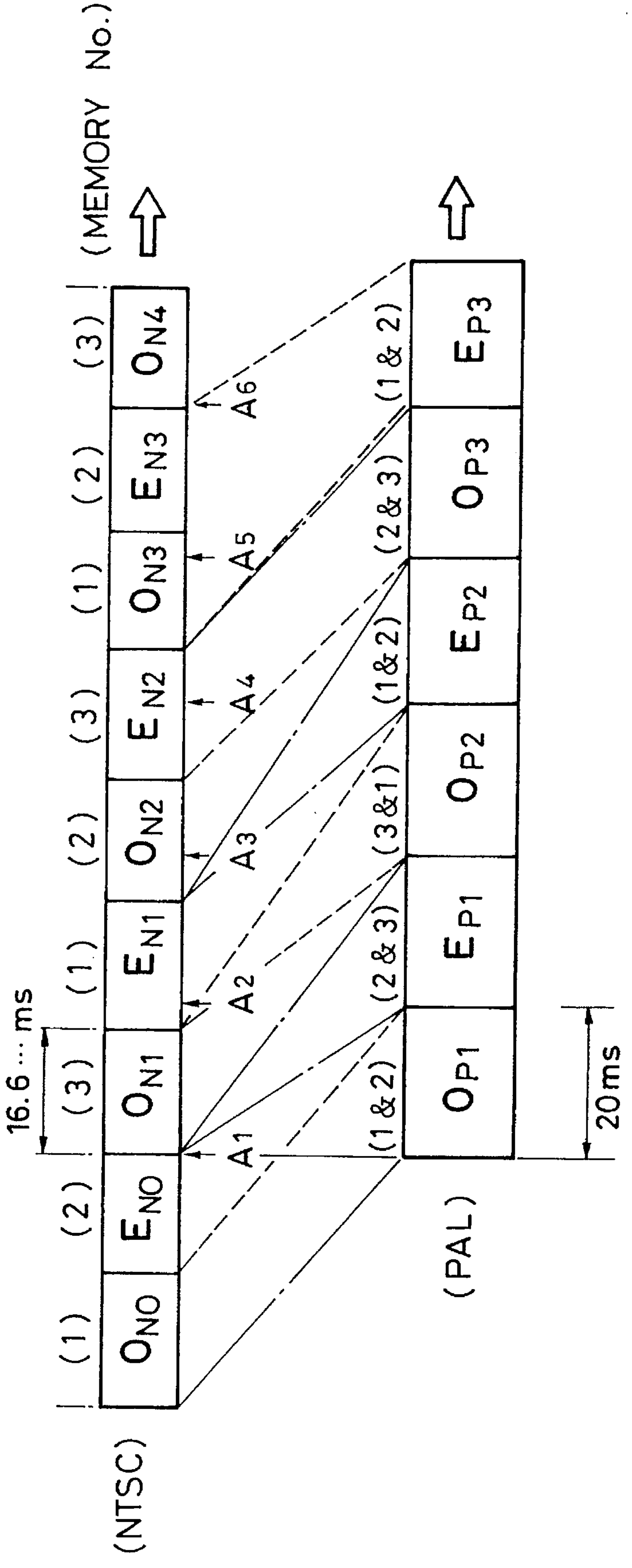
FIG. 4 is a diagram time-serially showing the relationship between image data being write/read controlled in the embodiment.

FIG. 4 shows the image data being written and read in the above operation in time series. The field memories (1), (2) and (3) shown in the upper portion of the figure store the odd-numbered field data ON0, the even-numbered field data EN0, and the odd-numbered field data ON1, which are image data in the NTSC format. Then, these memories are updated to sequentially store EN1, ON2, EN2, ON3, EN3, . . . every 16.66 . . . ms. Then, if, for example, the conversion (reading) to the frame data OP1 in the PAL format is started at a point A1 where writing of the odd-numbered field data ON1 in the memory (3) is started, the process determines, as shown in FIG. 3, in step 205 that the memory (3) is being written (Y), and proceeds to step 206. Therefore, the odd and even-numbered field data ON0 and EN0 stored in the memories (1) and (2) are read (at the same time, interpolated) and added, thereby forming the odd-numbered frame data OP1.

For the next frame data EP1 in the PAL format, step 201 determines at a point A2 that the memory (1) is being written, whereby the even-numbered frame data EP1 is formed from the even and odd-numbered field data EN0 and ON1 in the memories (2) and (3). Thus, PAL converted frame data OP2, EP2, OP3, EP3, . . . are sequentially obtained every 20 ms based on the three field memories (1), (2) and (3) of the NTSC system. With such arrangement, there arises no such situation where writing of image data in the NTSC format in the memories (1), (2) and (3) overtakes reading for conversion into the PAL format. Thus, there are provided advantages such that the bar noise can be prevented from generation, and that the PAL image data can be efficiently formed with less number of memories.

In other words, while, as described above, to eliminate the bar noise, field memories may be prepared for four frames, and one set (odd and even-numbered) of field data can be read while the other set of field data are being written, the present invention accommodates such situation with the field memories for three fields so that the memory capacity can be saved. When the present invention is compared with the prior art using four memories, the present invention has an advantage such that the motion can be more accurately captured. That is, when four memories are used, the system uses temporally older data only by one frame when comparing with the case where three memories are used to form the PAL image data so that reproducibility is deteriorated for an image with larger motion.

Although, in the above embodiment, it is arranged to store composite video signal in the memories (1), (2) and (3), in a system which processes R (red), G (green) and B (blue) signals, the memories (1), (2) and (3) are provided for the signals of R, G, and B, respectively. In addition, in a system which processes luminance signals and color difference signals, it may be arranged to process both signals as in the above, or to store only the luminance signals in the memories (1), (2) and (3) and to store the color difference signals with low resolution and contract in other memories for two frames.

As described above, the present invention can eliminate the bar noise and convert image data in the NTSC format into that in PAL format with less memory capacity.

What is claimed is:

1. An NTSC-Pal converter for generating image signals in the PAL format from signals in the NTSC format comprising:

field memories for three fields which are provided for storing said image data in the NTSC format for three fields;

a write control circuit for sequentially writing and controlling field signals in the NTSC format in said field memories for three fields;

a read control circuit for selecting from these field memories at the moment to start the conversion into the PAL format two field memories which are not being written into and controlling reading so that the image data in the two field memories is sequentially read out;

an output circuit for generating image signals in the PAL format from the image signals read by said read control circuit; and wherein said read control circuit preferably generates the frame image signals in the PAL format by adding horizontal line data of an odd-numbered field to that of an even-numbered field to produce horizontal line data of frame data in the PAL format, and reading and interpolating data in duplicate every predetermined number of horizontal lines.

2. An NTSC-PAL converter claimed in claim 1, wherein said output circuit is an adder circuit.

* * * * *